Figure 1:
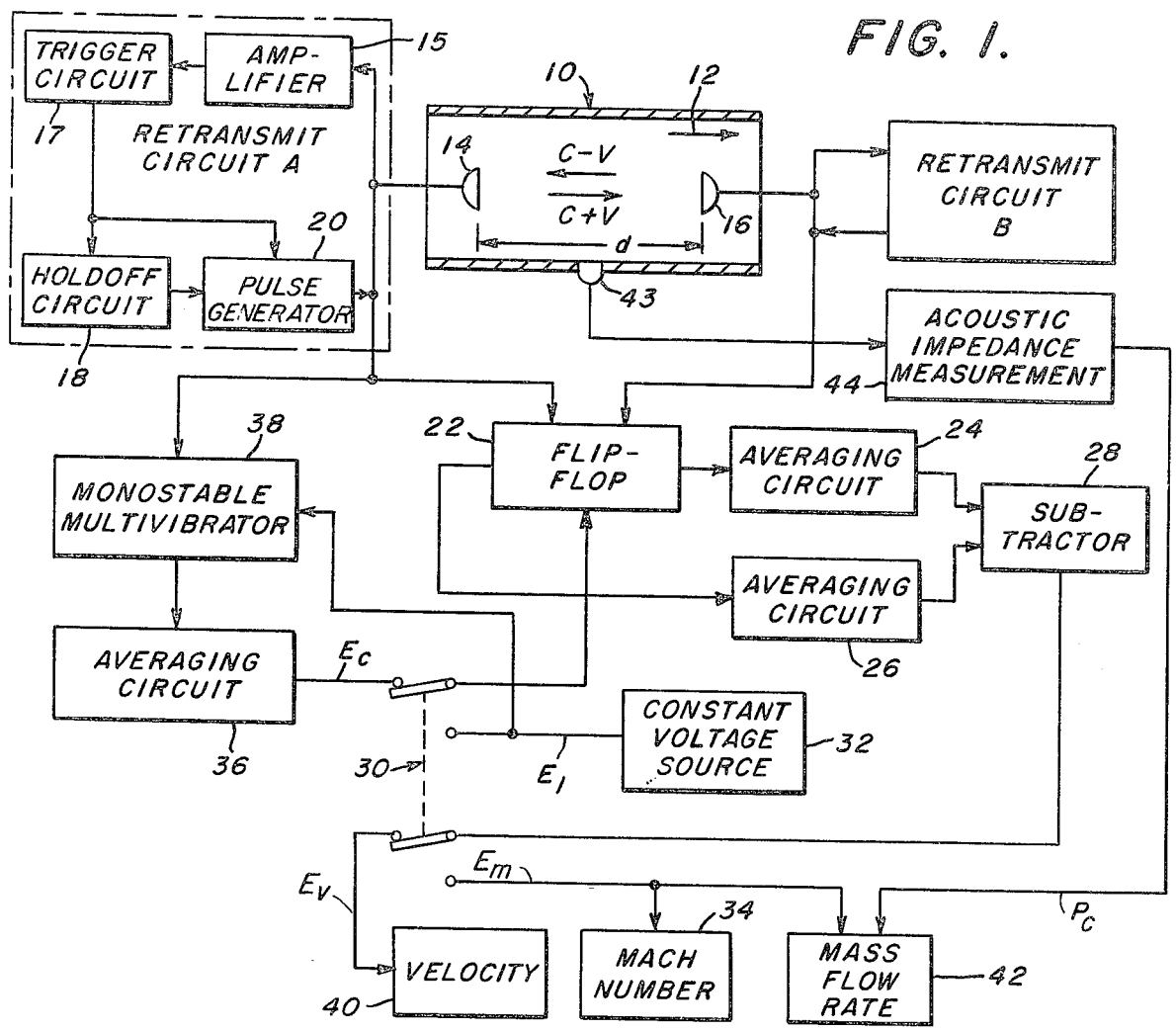

United States Patent
McShane

[19]

[11] 3,901,078

[45] Aug. 26, 1975

[54] ULTRASONIC SYSTEM FOR FLUID FLOW MEASUREMENT

[75] Inventor: James L. McShane, Pittsburgh, Pa.

[73] Assignee: Westinghouse Electric Corporation, Pittsburgh, Pa.

[22] Filed: Sept. 7, 1973

[21] Appl. No.: 395,317

[52] U.S. Cl. .............................................. 73/194 A
[51] Int. Cl.² ......................................... G01F 1/66
[58] Field of Search .................................. 73/194 A

[56] References Cited
UNITED STATES PATENTS

| | | | |
|---|---|---|---|
| 2,724,269 | 11/1955 | Kalmus | 73/194 A |
| 2,911,826 | 11/1959 | Kritz | 73/194 A UX |
| 3,486,377 | 12/1969 | Franchi | 73/290 V |
| 3,653,259 | 4/1972 | McShane | 73/194 A |

Primary Examiner—Charles A. Ruehl
Attorney, Agent, or Firm—C. M. Lorin

[57] ABSTRACT

A simplified ultrasonic flowmeter system in which transmit pulses are applied to each transducer of a pair of transducers aligned with a component of fluid flow in response to a received signal at that transducer. Flip-flop means triggered by successive pulses produces complementary waveforms whose average voltages are subtracted and modified to provide output signals proportional to velocity, Mach number and mass flow rate. The system incorporates automatic speed of sound correction when fluid velocity and mass flow rate are being determined.

15 Claims, 3 Drawing Figures

ULTRASONIC SYSTEM FOR FLUID FLOW MEASUREMENT

BACKGROUND OF THE INVENTION

The usual principle of ultrasonic flowmeters involves the transmission of ultrasonic waves through a fluid medium in two directions, one upstream and the other downstream of the direction of flow, and comparing the transit times, normally over equal paths of travel. The speed of sound in the fluid medium is the same over both paths; but the transit time varies according to the velocity of the fluid medium which shortens the transit time over the downstream path while lengthening the transit time over the upstream path. From a consideration of the difference between the upstream and downstream transit times, the flow velocity of the fluid medium can be calculated by either a time difference or frequency difference technique.

In the usual frequency difference technique, the received pulse in each path is used to trigger another transmit pulse, thus generating a train of pulses in each path whose period equals the transit time. The difference in frequency between the pulses in the respective paths is proportional to the velocity of the fluid. In the time difference system, it is necessary to determine fluid velocity by determining the time difference between received pulses at the respective transducers. In U.S. Pat. No. 3,653,259, issued Apr. 4, 1972, a time difference flowmeter system is provided wherein pulses are transmitted in both directions, using either two pairs of transducers or a single pair. The received pulses in each path trigger transmit pulses in their respective paths in sing-around fashion. That is, when a pulse is received at a transducer, it triggers the sing-around circuitry to substantially immediately transmit a successive pulse from the opposite transducer, thereby producing a series of received pulses one after the other. In contrast to the frequency difference system, the repetition of pulses is not continuous in the system shown in U.S. Pat. No. 3,653,259 but rather terminates after a given number of transmissions in each direction. The time difference between corresponding received pulses in each path is measured. This time difference is expanded over the original time difference, and the expanded time difference is then measured to determine the rate of fluid flow.

The system shown in U.S. Pat. No. 3,653,259, while highly useful, is not equally advantageous for all flow measurement applications. When such a system is used with a single pair of transducers, ringing following the transmit pulse is a problem because each transducer must receive a signal shortly after transmitting one. Two-way transmission using only one pair of transducers is preferred to avoid path differences that could exist with two pair. Furthermore, in certain applications, such as gas flow, the transducer design requirements may not permit sufficiently fast decay of ringing.

Another consideration is the magnitude of fluid velocity relative to sound velocity. In gas flow particularly, velocities can easily be a significant fraction of the sound velocity. Here the high sensitivity afforded by the time difference system of U.S. Pat. No. 3,653,259 is not needed. Hence, simpler techniques can be used.

SUMMARY OF THE INVENTION

In accordance with the present invention, an ultrasonic system for fluid flow measurement is provided which permits the measurement of fluid flow parameters such as velocity, Mach number, and mass flow rate while at the same time being simpler and less expensive than prior art time difference systems. Instead of using a sing-around system connecting the downstream to the upstream transducer as in prior art time difference flowmeters, transmit pulses are applied to each transducer of a pair within flowing fluid in response to a received signal at the same transducer. That is, sing-around or retransmit circuitry is provided at the downstream transducer, for example, for substantially immediately transmitting a pulse upstream in response to a received downstream pulse. A similar sing-around or retransmit circuit is provided for the upstream transducer such that it substantially immediately transmits a pulse downstream in response to a received upstream pulse. The action can be roughly compared to that of a tennis ball being batted back and forth, but wherein the tennis ball travels slower in one direction than in the other due to wind conditions (i.e., fluid velocity). By determining the upstream and downstream transit times and by subtracting the two, a measure of fluid velocity can be derived.

Specifically, there is provided in accordance with the invention at least one pair of oppositely-disposed but facing transducer means located in acoustic contact with a fluid stream and spaced along the path of travel of the stream. Circuitry is connected to one of the transducers for substantially immediately transmitting an ultrasonic signal upstream after a downstream ultrasonic signal has been received thereby. Similarly, circuitry is connected to the other of the transducers for substantially immediately transmitting an ultrasonic signal downstream after an upstream ultrasonic signal has been received by it. Flip-flop means are coupled to the circuitry for each transducer such that the flip-flop means will change from one stable state to another when a signal is transmitted from one transducer and will change from the other stable state back to the first state when a signal is transmitted from the other transducer. This produces complementary waveforms derived from opposite terminals of the flip-flop means. One of the waveforms contains successive pulses whose widths are essentially equal to the upstream transit time of an ultrasonic signal from one transducer to the other; while the other of the waveforms comprises successive pulses whose widths are essentially equal to the downstream transit time of an ultrasonic signal from one transducer to the other. Therefore, by electrically subtracting the widths of the pulses in one waveform from those in the other, an electrical signal can be derived which varies as a function of the velocity of the fluid stream.

As will be seen hereinafter, assuming that the amplitude of the pulses in the complementary waveform outputs of the flip-flops remain constant, subtraction of the average value of the complementary waveform will produce a signal equal to:

$$E_1 \left( \frac{v}{c} \right)$$

where $v$ is the velocity of the fluid, $c$ is the velocity of the sound, and $E_1$ is the amplitude of the pulses in the complementary outputs from the flip-flop means. Since $v/c$ is the Mach number, the voltage thus derived may be used in certain gas flow or velocity measuring applications.

However, when it is desired to determine the velocity of fluid flow, it becomes necessary to compensate for changes in sound velocity, $c$. This can be accomplished automatically in accordance with the invention by varying the value of $E_1$ to automatically compensate for changes in sound velocity, $c$.

Additionally, when it is desired to determine mass flow rate, the voltage thus derived by the subtraction process can be multiplied by factors proportional to the acoustic impedance and the cross-sectional area of a conduit through which it is flowing to derive mass flow rate.

Figure 2:
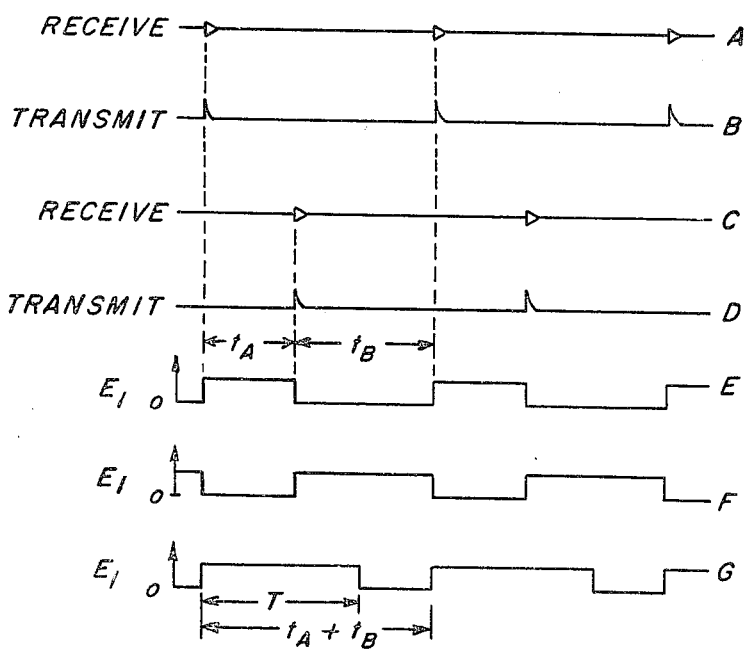
Figure 3:
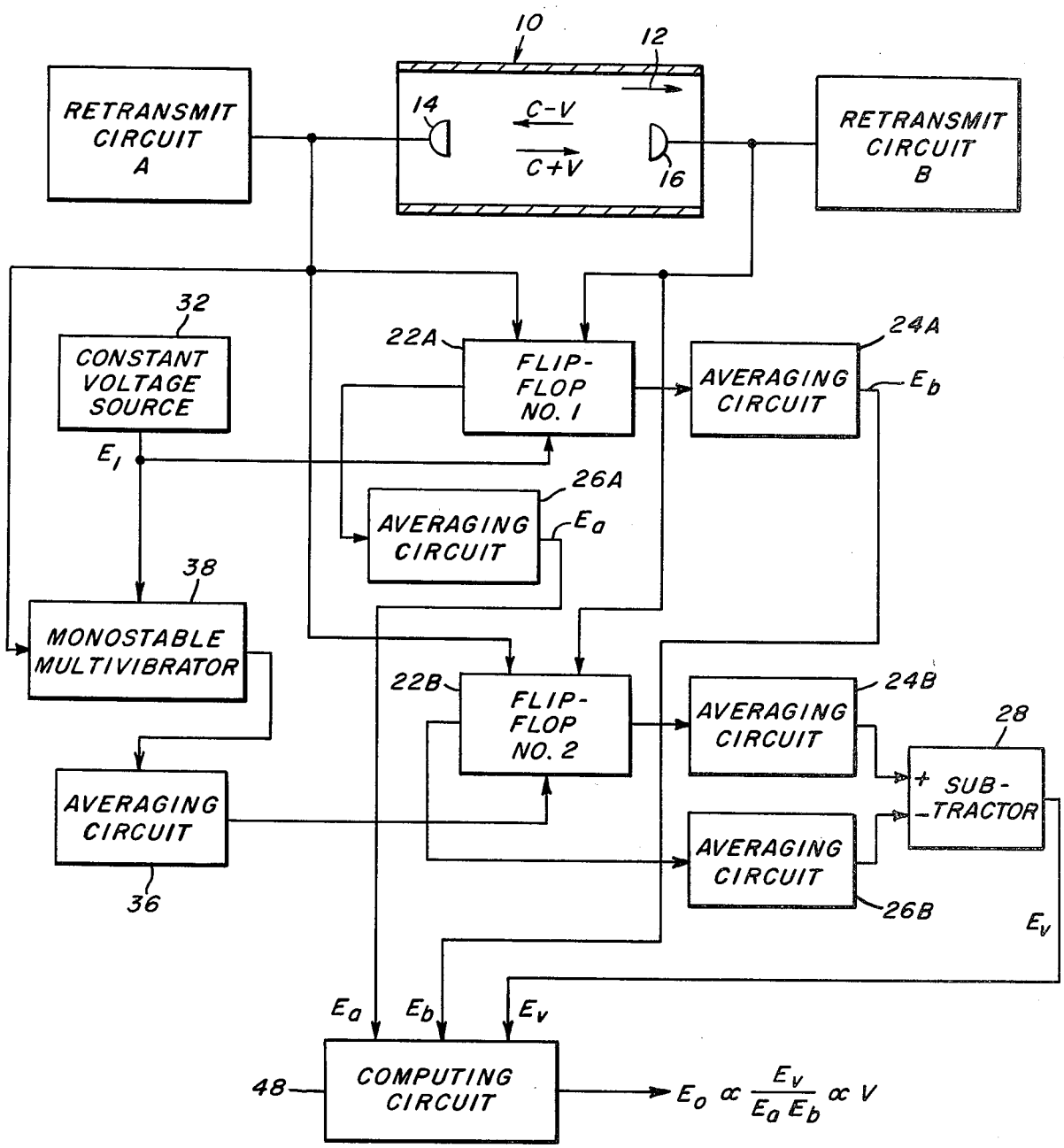

The above and other objects and features of the invention will become apparent from the following detailed description taken in connection with the accompanying drawings which form a part of this specification, and in which:

FIG. 1 is a schematic circuit diagram of the ultrasonic fluid flow measurement system of the invention;

FIG. 2 comprises waveforms illustrating the operation of the circuit of FIG. 1; and FIG. 3 is a schematic circuit diagram of an alternative embodiment of the invention.

With reference now to the drawings, and particularly to FIG. 1, a conduit 10 is shown having a fluid flowing therethrough in the direction of arrow 12 at a velocity $v$. Disposed within the conduit 10 in the path of travel of fluid flowing therethrough is a pair of ultrasonic transducers 14 and 16 which face each other and which are spaced apart by the distance $d$. In conduits it is more likely that transducers will be disposed in the walls with the acoustic path forming an angle $\theta$ with the conduit axis. For this case, $v$ should be replaced by $v \cos \theta$ in all equations given hereafter. Assuming that $c$ is the sound velocity in the fluid at rest and that $v$ is the velocity of the fluid flowing through the conduit 10, ultrasonic pulses transmitted from the upstream transducer 14 will have a speed equal to $(c + v)$. Similarly, pulses transmitted from the downstream transducer 16 will have a velocity equal to $(c - v)$ since, in this case, they are being transmitted against the flowing fluid. Furthermore, the transit times downstream $t_A$ (from transducer 14 to transducer 16) and upstream $t_B$ are:

(1) $$t_A = \frac{d}{c+v}$$

(2) $$t_B = \frac{d}{c-v}$$

where $d$ is the distance between transducers.

Coupled to transducer 14 is a retransmit circuit A; and coupled to transducer 16 is a retransmit circuit B. Each of the retransmit circuits A and B is the same; and only circuit A will be described in detail. It includes an amplifier 15 responsive to a received pulse detected by the transducer 14. This received pulse comprises a short burst of ultrasonic wave energy. After amplification in amplifier 15, the received pulse is applied to a trigger circuit 17 which triggers a transmit pulse when the leading edge (usually the first or second half cycle) of the received ultrasonic signal exceeds a threshold setting. Once the trigger circuit 17 is actuated, the resulting trigger signal triggers pulse generator 20. Pulse generator 20 thus produces a narrow electrical pulse which shock-excites the transmitting transducer and hence generates an acoustic pulse which is transmitted from the upstream transducer 14 to the downstream transducer 16. Once triggering has occurred, the application of the transmit pulse to the receiver circuitry has no undesirable effect, provided that the receiver circuitry is protected from damage and that retriggering within a certain time interval following the transmit pulse is prevented. The latter function is provided by holdoff circuit 18, which could be connected to the trigger circuit 17 or the amplifier 15 instead of pulse generator 20. As described in U.S. Pat. No. 3,653,259, the holdoff circuit can be an astable multivibrator which operates in the triggered mode when ultrasonic received signals are present. In this mode, it performs like a monostable multivibrator, and the duration of the state to which it is triggered is the hold-off interval. In the absence of a received ultrasonic signal, the astable multivibrator switches states at a time determined by its free-running period, and triggers another transmit pulse. It thus provides a restarting function that at least one of the retransmit circuits should have, in case of temporary interruption of ultrasonic pulse propagation. The pulse generator 20 could be, for example, a blocking oscillator, a thyristor circuit, or an avalanche transistor circuit.

The operation of the circuit can perhaps best be understood by reference to waveforms A, B, C and D of FIG. 2. Waveform A represents the received pulses at the upstream transducer 14; while waveform B represents the transmitted pulses from this same transducer. It can be seen that a transmitted pulse is generated almost immediately upon receipt of a received pulse. The acoustic pulses generated by transmitted pulses (waveform B) travel to the downstream transducer 16 over a time interval $t_A$. These pulses arrive as received pulses (waveform C) at transducer 16. Again, for each received pulse in waveform C, a transmitted pulse in waveform D is generated almost immediately. This pulse travels upstream over a longer time interval $t_B$ and then forms a received pulse in waveform A; whereupon the process is repeated. Note that a time interval $t_A + t_B$ is allowed for ringing decay following the transmit pulse before a given transducer must be capable of detecting a received signal. In other two-transducer travel time difference ultrasonic flowmeters, the allowed time is $t_A$ or $t_B$ or a smaller time interval.

The transmit pulses from the pulse generators, or time coincident trigger pulses, in each of the transmit circuits A and B are applied to opposite sides of a flip-flop circuit 22 which produces two complementary outputs. These appear as waveforms E and F in FIG. 2. By separately averaging (or integrating, or filtering) the waveforms E and F in averaging circuits 24 and 26 and by subtracting the average or DC values in subtractor 28, an output voltage $E_m$ is derived which is proportional to the Mach number, assuming that the magnitude $E_1$ of the waveforms E and F remains constant. In this respect, when it is desired to determine the Mach number, a switch 30 connects a constant voltage source 32 (FIG. 1) to the flip-flop circuit 22 so as to maintain the upper voltage level $E_1$ of the pulses in waveforms E and F constant. The waveform $E$ of FIG. 2 has an average value equal to:

$$(3) \quad E_a = \frac{E_1 t_A}{t_A + t_B}$$

The complementary waveform F has an average value equal to:

$$(4) \quad E_b = \frac{E_1 t_B}{t_A + t_B}$$

The difference in the average values, comprising the signal $E_m$ is, therefore:

$$(5) \quad E_m = E_b - E_a = \frac{E_1 (t_B - t_A)}{t_B + t_A}$$

Substituting the expressions for $t_A$ and $t_B$ from Equations (1) and (2) into Equation (5) yields the result:

$$(6) \quad E_m = E_1 \frac{v}{c}$$

Since $v/c$ is the Mach number, and assuming that the voltage level of $E_1$ is constant, the difference voltage $E_m$ is proportional to the Mach number. This voltage $E_m$, therefore, may be applied to a Mach number display unit 34 or the like which is calibrated to show the Mach number under varying conditions.

From a consideration of Equation (6) above it can be seen that the voltage $E_m$ is also proportional to the velocity $v$ of the fluid, assuming that the speed of sound, $c$, remains constant. In point of fact, however, the speed of sound $c$ may not remain constant. Changes in speed of sound, however, can be compensated for by using a varying voltage $E_c$ instead of constant voltage $E_1$ in Equation (6) above. In this respect, the switch 30 (FIG. 1) can be used to connect the power supply terminal of the flip-flop 22 to an averaging circuit 36 connected to the output of a monostable multivibrator 38 to which the transmit pulses from circuit A are applied. Under these circumstances, the output of the monostable multivibrator 38 will appear as waveform G in FIG. 2 which comprises a series of pulses all of equal width, determined by the pulse width T of the monostable multivibrator 38. If a monostable or triggered astable multivibrator is used as the holdoff circuit 18, this same circuit can provide the function of monostable multivibrator 38. The number of pulses in waveform G, however, will vary as the sound velocity varies. That is, if the sound velocity should drop, the time interval between the received and transmitted pulses in waveforms A and B will increase with the result that a fewer number of pulses will appear in waveform G over a period of time. Mathematically, this can be shown as follows: Let $E_c$ be the average value of the waveform G in which a pulse of constant width T and voltage $E_1$ is generated once each repetition period $(t_A + t_B)$. In FIG. 2, the pulses in waveform G are shown starting with the transmit pulse at transducer 14; however, it could start with the transmit pulse at transducer 16 with the same effect. If the output pulse magnitude of the monostable multivibrator 38 is $E_1$, then the average value $E_c$ of waveform G is:

$$(7) \quad E_c = \frac{E_1 T}{t_A + t_B}$$

Since:

$$(8) \quad t_A + t_B = \frac{2 dc}{c^2 - v^2}$$

then $$(9) \quad E_c = \frac{E_1 T (c^2 - v^2)}{2 dc}$$

Therefore, the output voltage can be represented as:

$$(10) \quad E_r = E_c \left(\frac{v}{c}\right) = \left[\frac{E_1 T (c^2 - v^2)}{2 dc}\right] \frac{v}{c}$$

or $$(11) \quad E_r = \frac{E_1 T v}{2d} \left[1 - \left(\frac{v}{c}\right)^2\right].$$

In liquids $(v/c)^2$ is always negligibly small because of the relatively low velocity of the liquid; and in gases the effect of this term would generally be small. For example, if $v$ is 10 percent of $c$ ($v \approx 110$ ft/sec in air), the sensitivity is changed only 1 percent, but the resulting nonlinearity from the best straight line is only $\pm 0.17$ percent of full scale if $v = 0.1c$ is the full scale velocity. When $v \approx 0.25c$, nonlinearity is $\pm 1$ percent. Therefore, the output is proportional to fluid velocity and independent of sound velocity to a very good approximation. Under these circumstances, and with the flip-flop connected to the averaging circuit 36 to provide a source of voltage to its power supply terminals, the output of the subtractor $E_r$ will be proportional to velocity and can be displayed on a velocity meter 40 or the like (FIG. 1) which is calibrated to show velocity directly in feet per second, for example. The velocity meter can also be calibrated in terms of volume flow rate Q, since $Q = vA$ where $A$ equals cross-sectional area of the duct. It is assumed here for simplicity that $v$ is uniform across the duct. A predetermined correction, or a calibration procedure, can account for the error caused by non-uniform velocity profiles.

If acoustic impedance $\rho c$ is measured or determined from density, temperature, pressure, and other measurements, mass flow rate can be determined as follows:

$$(12) \quad \text{Mass flow rate} = \frac{v}{c} \times \rho c \times A = \rho v A$$

where $\rho$ equals density and $A$ equals cross-sectional area. As was mentioned above, the quantity $E_m$, with flip-flop 22 connected to the constant voltage source 32, is proportional to $v/c$. Therefore, by applying this signal to a mass flow rate determining circuit 42 along with a signal proportional to $\rho c$ determined from circuit 44, an electrical signal can be derived which is proportional to mass flow rate and independent of sound velocity. Area A is constant for a given application and can be preset into the circuit 42. Acoustic impedance can be determined from measurements of signals reflected at the interface between a material coupling the acoustic pulses to the fluid (it could be the conduit wall) and the fluid itself. Reflection coefficient is a function only of acoustic impedance mismatch. Acoustic impedance could also be measured in terms of the loading on the transducer coupled directly to the fluid. A separate transducer 43 and an acoustic impedance measuring circuit 44 are shown in FIG. 1.

For greater accuracy in determining $v$, especially for larger values of $v/c$, a secondary correction can be made if the Mach number output $E_m$ is available, for example, by having a separate flip-flop circuit connected permanently to the constant voltage source of voltage $E_1$. From Equation (6), $$(13) \quad \frac{v}{c} = \frac{E_m}{E_1}$$

and thus Equation (11) can be written:

$$(14) \quad E_v = \frac{E_1 T v}{2 d}\left[1 - \left(\frac{E_m}{E_1}\right)^2\right]$$

Solving for $v$, $$(15) \quad v = \frac{2d\, E_v}{E_1 T [1 - (E_m/E_1)^2]}$$

which expresses $v$ independent of $c$ in terms of measurable quantities $E_v$ and $E_m$, and various constants.

Using Equation (5) it can be shown that:

$$(16) \quad 1 - (E_m/E_1)^2 = \frac{4\, E_a E_b}{E_1{}^2}$$

Substitution in Equation (15) yields:

$$(17) \quad v = K\, \frac{E_v}{E_a E_b}$$

where $$(18) \quad K = \frac{d\, E_1}{2\, T}$$

Therefore, if an output signal equal to $E_v/(E_a E_b)$ is produced from the separate voltages $E_v$, $E_a$ and $E_b$ available in the system, velocity is proportional to this output signal with a constant of proportionality $K$. This equation holds for any velocity, but with the transducer arrangement shown in FIG. 1 it will be limited to $v < c$ because if $v \geq c$, a pulse cannot be propagated upstream.

FIG. 3 shows a system for measuring $v$ as indicated above wherein elements corresponding to those of FIG. 1 are identified by like reference numerals. In this case, two flip-flops 22A and 22B are triggered by the transmit pulses so that voltages $E_a$, $E_b$ and $E_v$ can be generated simultaneously. Flip-flop 22A is connected to a constant voltage source 32 and hence generates $E_a$ and $E_b$ as in the Mach number measuring arrangement. Flip-flop 22B is connected to the variable voltage source 36 in the velocity measuring connection in FIG. 1, and hence $E_v$ is generated as before by subtracting the average values of the flip-flop complementary outputs from circuits 24B and 26B. A computing circuit connected to averaging circuits 24A and 24B generates an output proportional to $(E_v/E_a E_b)$ and hence to $v$. The computation could be done by analog or digital means, or could be done manually. Mach number and mass flow rate measurements can be obtained if desired as in FIG. 1, except that switching is not necessary. A single flip-flop could provide both constant magnitude and variable magnitude outputs if, for example, the variable voltage output was used and also passed through a clipping circuit which removed the variable portion.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. In an ultrasonic flowmeter, the combination of at least one pair of transducer means located in acoustic contact with a fluid stream, facing each other and spaced in the path of travel of said fluid stream:

first means coupled to a first one of said transducer means located downstream relative to the second one of said transducer means for triggering said first transducer means to transmit an ultrasonic signal upstream in response to a downstream ultrasonic signal received from said second transducer means by said first transducer means.

second means coupled to said second transducer means for triggering said second transducer means to transmit an ultrasonic signal downstream in response to an upstream ultrasonic signal received from said first transducer means by said second transducer means.

means responsive alternately to said first and second triggering means for deriving a signal representation of a first time interval between the transmission of said upstream ultrasonic signal by said first transducer means and the reception thereof by said second transducer means and of a second time interval between the transmission of said downstream ultrasonic signal by said second transducer means and the reception thereof by said first transducer means; and means responsive to said signal representation deriving means for generating a signal representative of the velocity of said fluid stream.

2. The combination of claim 1 with said signal representation deriving means being responsive to said first and second triggering means for deriving a first signal representative of said first time interval initiated by a pulse transmission concurrently with said first transducer means, and being responsive to said first and second triggering means for deriving a second signal representative of said second time interval initiated by a pulse transmission concurrently with said second transducer means, and with said fluid velocity signal generating means being responsive to said first and second signals for providing said fluid velocity representative signal.

3. The combination of claim 2 wherein said first and second signals are mutually complementary rectangular waveforms each denoting a succession of rectangular pulses having a width proportional to the one of said first and second time intervals represented by the respective signal; wherein said signal representation deriving means include means for deriving signal representations of said pulse widths and wherein said fluid velocity signal generating means include means for subtracting said signal representations to provide a signal whose magnitude is proportional to the difference between the widths of said pulses in the complementary waveforms representing the difference between said first and second time intervals.

4. The combination of claim 3 with means for correcting said fluid velocity representative signal as a function of sound velocity within said fluid stream.

5. The combination of claim 3 wherein each of said signal representations is provided by deriving the magnitude of the average value of the corresponding rectangular waveform over a cycle thereof.

6. The combination of claim 5 with means responsive to said velocity representative signal for indicating the Mach number.

7. The combination of claim 5 with means for generating a third signal of rectangular waveform denoting a succession of rectangular pulses having a predetermined width, said rectangular pulses of said third signal being recurrently initiated by a selected one of said first and second triggering means;
with means responsive to said third signal for deriving a representation of the inverse of the sum of said first and second time intervals, said third signal being applied to said signal representation deriving means.

8. The combination of claim 7 with said means for deriving a representation of the inverse of the sum of said first and second time intervals comprising means for deriving the magnitude of the average value of the rectangular waveform of said third, signal over a cycle thereof.

9. The combination of claim 3 with said signal representation deriving means including flip-flop means responsive to triggering of said first and second transducer means to change from one stable state to another when an acoustic signal is transmitted from one of said first and second transducer means and to change from said another state to said one state when an acoustic signal is transmitted from the other of said first and second transducer means thereby to provide at least one signal having a rectangular waveform characterized by said first and second time intervals, as said time interval signal representation.

10. The combination of claim 9 with said flip-flop means providing two signals in response to triggering of the respective transducer means, said flip-flop means signals having mutually complementary rectangular waveforms, said velocity signal generating means being responsive to the respective first and second time interval characteristics of said waveforms.

11. The combination of claim 10 with said signal representation deriving means including means for producing a third rectangular waveform of predetermined width each time an ultrasonic signal is transmitted from one of said transducer means, means for producing a voltage whose magnitude is proportional to the average value of said third waveform over a cycle thereof, and means for applying said voltage to said flip-flop means as a source of driving potential, whereby the magnitude of said mutually complementary flip-flop means signals will vary as a function of the speed of sound within said fluid steam.

12. The combination of claim 11 wherein said fluid velocity signal generating means includes means for providing a voltage $E_v$ proportional to $$v \left[ 1 - \left( \frac{v}{c} \right)^2 \right]$$

where $v$ is the velocity of the fluid stream and $c$ is the speed of sound in the fluid at rest;
wherein said signal representation deriving means provides a voltage $E_a$ proportional to one of said first and second time intervals and inversely proportional to the sum of said first and second time intervals, and a voltage $E_b$ proportional to the other of said first and second time intervals, and inversely proportional to the sum of said first and second time intervals; and wherein said fluid velocity signal generating means further includes means for determining the fluid stream velocity from a computation of $$\frac{E_v}{E_a \times E_b}$$

13. The combination of claim 10 wherein said signal whose magnitude is proportional to the difference between the widths of the pulses in the complementary waveforms is $E_m$ equal to:

$$E_m = E_1 \left[ \left( \frac{v}{c} \right) \right]$$

a source of constant voltage $E_1$ being applied to said flip-flop means for providing a voltage level $E_1$ for said waveforms, and where $v$ is the velocity of the fluid stream and $c$ is the speed of sound in the fluid at rest.

14. The combination of claim 13 including a conduit through which the fluid stream flows, wherein a velocity meter is provided responsive to said velocity representative signal, said velocity meter being calibrated to show directly the volume flow rate Q where $Q = vA$, with $A$ equal to the cross-sectional area A of said conduit.

15. The combination of claim 1 wherein each of said first and second triggering means includes an amplifier, a pulse generator, a trigger circuit and an hold-off circuit, said trigger circuit being responsive to a received amplified ultrasonic wave for triggering the associated pulse generator and for triggering the associated hold-off circuit to prevent the associated pulse generator from being triggered again for a specific time interval.

* * * * *

UNITED STATES PATENT OFFICE
CERTIFICATE OF CORRECTION

PATENT NO. : 3,901,078
DATED : August 26, 1975
INVENTOR(S) : James L. McShane

It is certified that error appears in the above-identified patent and that said Letters Patent are hereby corrected as shown below:

Column 7, line 31, change "$E_r = \dfrac{E_1 T_v}{2d} \left[ 1 - \dfrac{(E_m{}^2)}{E_1} \right]$"

to -- $E_v = \dfrac{E_1 T_v}{2d} \left[ 1 - \left(\dfrac{E_m}{E_1}\right)^2 \right]$ --.

Column 10, line 19, change " $v \; 1 - \left(\dfrac{v}{c}\right)^2$ " to

-- $v \left[ 1 - \left(\dfrac{v}{c}\right)^2 \right]$ --.

Column 10, line 46, change "$E_m = E_1 \left[ \left(\dfrac{v}{c}\right) \right]$" to -- $E_m = E_1 \left(\dfrac{v}{c}\right)$ --.

Signed and Sealed this twenty-ninth Day of June 1976

[SEAL]

Attest:

RUTH C. MASON
*Attesting Officer*

C. MARSHALL DANN
*Commissioner of Patents and Trademarks*